Slocum & Turner,
Tanning App's.
No. 106,085. Patented Aug. 2, 1870.

Witnesses: J. D. Mason, Clarence Parker.
Inventors: John H. Slocum, Geo. F. Turner.

UNITED STATES PATENT OFFICE.

JOHN H. SLOCUM AND GEORGE F. TURNER, OF FAYETTE, MAINE.

IMPROVEMENT IN TANNING.

Specification forming part of Letters Patent No. 106,085, dated August 2, 1870.

*To all whom it may concern:*

Be it known that we, JOHN H. SLOCUM and GEORGE F. TURNER, of Fayette, in the county of Kennebec and State of Maine, have invented a new and useful machine called a "Tanning-Reel," for turning all kinds of hides and skins into leather; and we do hereby declare that the following is a full, clear, and exact description of the construction and operation of the same, reference being had to the drawings of said machine, making a part of this specification.

The improvements in this machine and process consist as follows: A reel of any desirable dimensions is covered longitudinally with removable slats or bars. Said slats or bars are provided on their outer face with hooks or brads, and placed on the reel at a suitable distance apart.

Figure 1:
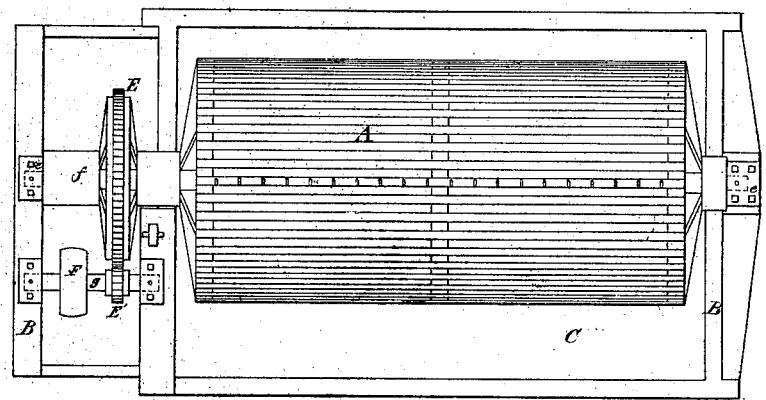
Figure 2:
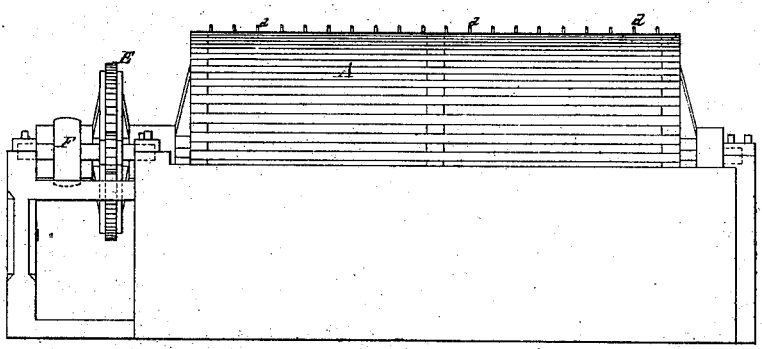
Figure 3:
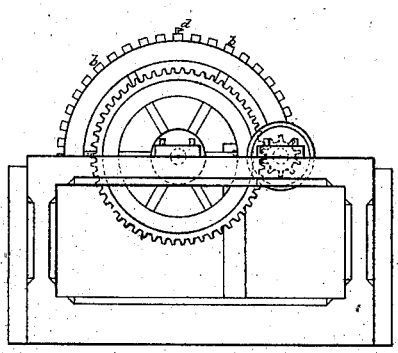
Figure 4:
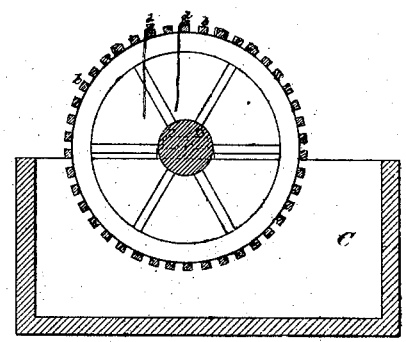

In the accompanying drawings, Figure 1 represents a top or plan view of the machine. Fig. 2 is a side elevation. Fig. 3 is an end elevation, and Fig. 4 represents a cross-section.

In the drawings, A represents a reel, of any suitable dimensions, covered with longitudinal removable slats or bars $b$, which are provided on their outer edge or face with hooks or brads $d$, for attaching the hides to and suspending them within the reel A. The slats or bars $b$ are made removable by means of hooks, staples, or other suitable means, so as to be readily and easily taken out for the purpose of loading or attaching the rawhides thereto. The slats or bars are then replaced on the reel, and when the hides have been thoroughly tanned they may be left hanging to the bars, and both bars and hides hung up to allow the hides to dry, and another set of bars be loaded and placed on the reel for a similar operation.

The reel A is revolved on suitable journals, $e$ $e$, on the frame-work B, and operated by a proper gear-wheel, E, on shaft $f$, and pinion E of shaft $g$, upon this latter being arranged the pulley F, driven by a suitable belt. The gearing is so arranged as to rotate the reel A slowly. The lower part of the frame-work B, immediately under the reel A, forms a proper vat, C, for containing the liquor or tanning-lye.

The operation is as follows: The hides having been first attached to the hooks or brads $d$ on the bars $b$, said bars are arranged in their proper staples or fastenings on the reel, allowing the suspended hides to hang loosely within the inside of the reel. The vat is filled with proper liquor, and the reel is slowly revolved by the operating-gearing. By this means the hides have sufficient time to drip before they are again submerged into the liquor contained in the vat C, and are thereby prevented from graining, receive a lighter and more uniform color, which greatly enhances their market value, and, besides, are tanned in about one-third of the time required by the old process.

Having thus fully described our invention, what we claim, and desire to secure by Letters Patent, is—

The combination and arrangement of the reel A with the bars $b$, provided with hooks or brads $d$, with the vat C, frame B, and gearing E F, all constructed and arranged as herein shown and described, and for the purposes set forth.

JOHN H. SLOCUM.
GEO. F. TURNER.

Witnesses:
EMERY O. BEAN,
A. D. JENNES.